(12) United States Patent
Kamat et al.

(10) Patent No.: US 8,065,040 B2
(45) Date of Patent: Nov. 22, 2011

(54) ON-SITE POWER PLANT CONTROL INCLUDING ADAPTIVE RESPONSE TO TRANSIENT LOAD REQUIREMENTS

(75) Inventors: Mithun R. Kamat, Manchester, CT (US); Sara E. Atkinson, West Grove, PA (US); Aaron W. Morrow, East Longmeadow, MA (US); David P. Lavigne, Holyoke, MA (US); Guang-Yan Zhu, Simsbury, CT (US)

(73) Assignee: Carrier Corporation, Farmington, CT (US)

( * ) Notice: Subject to any disclaimer, the term of this patent is extended or adjusted under 35 U.S.C. 154(b) by 664 days.

(21) Appl. No.: 12/093,348

(22) PCT Filed: Dec. 19, 2005

(86) PCT No.: PCT/US2005/046032
§ 371 (c)(1),
(2), (4) Date: May 12, 2008

(87) PCT Pub. No.: WO2007/073365
PCT Pub. Date: Jun. 28, 2007

(65) Prior Publication Data
US 2008/0319586 A1   Dec. 25, 2008

(51) Int. Cl.
*G06F 19/00* (2011.01)
(52) U.S. Cl. ........................... 700/286; 700/293
(58) Field of Classification Search .......... 700/286, 700/287, 291, 293; 307/39; 416/132 B; 455/572; 60/39, 238, 243; 290/45, 2, 52, 290/40
See application file for complete search history.

(56) References Cited

U.S. PATENT DOCUMENTS

| | | | | |
|---|---|---|---|---|
| 3,646,356 A | * | 2/1972 | Hoffman | 307/87 |
| 3,733,095 A | * | 5/1973 | Sinclair et al. | 290/52 |
| 4,018,044 A | * | 4/1977 | Joby et al. | 60/791 |
| 4,154,000 A | * | 5/1979 | Kramer | 33/366.14 |
| 4,179,742 A | * | 12/1979 | Stern et al. | 700/287 |
| 4,208,591 A | * | 6/1980 | Yannone et al. | 700/287 |
| 4,222,229 A | * | 9/1980 | Uram | 60/773 |
| 4,258,545 A | * | 3/1981 | Slater | 60/226.1 |
| 4,430,573 A | | 2/1984 | Kaya et al. | |
| 4,875,168 A | * | 10/1989 | Martin | 701/99 |
| 6,376,937 B1 | | 4/2002 | Stewart | |
| 6,522,030 B1 | * | 2/2003 | Wall et al. | 307/43 |
| 6,639,331 B2 | * | 10/2003 | Schultz | 307/84 |
| 6,710,055 B2 | * | 3/2004 | Hauel et al. | 514/303 |

(Continued)

OTHER PUBLICATIONS

International Search Report and Written Opinion of the International Searching Authority for International application No. PCT/US05/46032 mailed Aug. 29, 2006.
Supplementary European Search Report for Application No. EP 05 85 4697 mail Oct. 7, 2010.

(Continued)

*Primary Examiner* — Kidest Bahta
(74) *Attorney, Agent, or Firm* — Carlson, Gaskey & Olds PC

(57) ABSTRACT

An on-site power plant (24) has a controller (40) that selectively controls operation of prime movers (26, 28, 30). In one example, the controller (40) changes the number of operating prime movers responsive to a transient in a load (22) requirement while continuing to operate at least one of the prime movers. One example includes prioritizing the prime movers (26, 28, 30) for operation based upon the needs of a cogeneration unit (32, 34, 36) associated with the prime movers for providing a temperature control function within a facility. Another example includes controlling operation of the prime movers based upon a capacity for fueling the prime movers.

22 Claims, 2 Drawing Sheets

U.S. PATENT DOCUMENTS

| | | | | |
|---|---|---|---|---|
| 6,978,620 B2 * | 12/2005 | Cooper et al. | ............... | 60/778 |
| 7,112,893 B1 * | 9/2006 | Villanueva | ............... | 290/55 |
| 7,116,010 B2 | 10/2006 | Lasseter et al. | | |
| 7,279,800 B2 * | 10/2007 | Bassett | ............... | 290/2 |
| 2003/0224833 A1 | 12/2003 | Egan et al. | | |
| 2004/0027004 A1 | 2/2004 | Bayoumi et al. | | |
| 2005/0096759 A1 * | 5/2005 | Benjamin et al. | ............... | 700/62 |

OTHER PUBLICATIONS

Lasseter et al: "Integration of distributed energy resources the CERTS MicroGrid concept", White Paper Consortium for Electric Reliability Technology Solutions, XX, XX, No. LBNL-50829, Apr. 1, 2002, pp. 1-27, XP002968309.

* cited by examiner

ON-SITE POWER PLANT CONTROL INCLUDING ADAPTIVE RESPONSE TO TRANSIENT LOAD REQUIREMENTS

FIELD OF THE INVENTION

This invention generally relates to on-site power plants. More particularly, this invention relates to controlling operation of the components of an on-site power plant.

DESCRIPTION OF THE RELATED ART

On-site power plants are known. Typical arrangements include a plurality of prime movers for generating power. Microturbines serve as the prime movers in some examples.

Most on-site power plants provide electrical power to a facility such as a building. Some on-site power plants provide thermal energy, electrical energy and include temperature control functions to provide heating or cooling to a facility. Such arrangements typically include a cogeneration unit that operates based upon exhaust from a microturbine. Depending on the need for heating or cooling within the facility, the cogeneration unit operates in a corresponding fashion, utilizing exhaust from the prime movers according to the arrangement of a particular system.

In some situations, on-site power plants include several groups of prime movers, each group being associated with a cogeneration unit. There are various challenges in controlling the operation of such on-site power plants.

A primary concern for many installations is to avoid having the on-site power plant generate more power than that which is required by the load to avoid power being exported to a grid associated with an external power source such as a utility company. Safety relays shut off an on-site power plant if the power exported to the grid exceeds a selected threshold, which may be power or time-dependent.

For example, an on-site power plant may be operating at a desired power level when there is a rapid down transient in the amount of power required by the load. To avoid having excess power exported to the grid, the typical solution is to shut down the entire on-site power plant. Under such a circumstance, the outside power source provides power to the facility. That solution has drawbacks including potentially leaving the facility without heating or cooling for some period of time, which requires incurring increased utility demand charges. Additionally, the locally generated power from the on-site power plant may not be provided for an extended period of time, which defeats the purpose of having the on-site power plant.

Another issue with existing arrangements is that the exhaust gas stream provided to the cogeneration unit does not always correspond to the demand for heating or cooling within the facility. In many circumstances, there are efficiency losses because excess exhaust gas from the prime movers is vented to atmosphere, supplementary heaters or chillers are required to maintain a desired temperature within the facility, or both. There are known building management systems that are capable of determining which cogeneration unit of a group of units associated with an on-site power plant would be best suited to provide a required temperature in a facility. There has been no arrangement, however, that utilizes such information in controlling the prime movers of an on-site power plant.

Another issue associated with known arrangements is that the natural gas fuel provided to the prime movers typically must be processed (e.g., through a booster). There are situations where one or more fuel boosters may malfunction or be temporarily taken out of service for repair or routine maintenance, for example. Under such circumstances, known arrangements tend to shutdown the entire on-site power plant because the available capacity for fueling is not adequate for operating the prime movers that are running under such circumstances. Additionally, during start up of prime movers, high inlet gas pressures require higher fuel consumption rates compared to normal operation. One attempt at addressing this issue is to provide excess gas booster capacity for starting the prime movers. This adds cost to a system, which is undesirable. There is a need for an improved control strategy for operating prime movers based upon fuel gas availability.

This invention addresses the need for improved control over on-site power plant operation and avoids the various drawbacks mentioned above.

SUMMARY OF THE INVENTION

An exemplary method of controlling an on-site power plant that has a plurality of prime movers for generating power includes operating a plurality of the prime movers to generate a first level of power for a load. Operation of the prime movers is adjusted responsive to a down transient in the load while continuing to operate at least one of the plurality of prime movers to generate a second, relatively lower level of power for the load.

By maintaining at least one of the prime movers in operation, the disclosed example avoids shutting down the entire on-site power plant responsive to a down transient in the power requirements at a load whenever such continued operation is possible while avoiding tripping the relay. This example provides the benefit of continuing to realize the advantage of having an on-site power plant while also avoiding exporting power to a grid in a manner that would otherwise result in shutdown of the on-site power plant by tripping a reverse power protective relay.

One example includes determining a capacity for fueling the on-site power plant based upon an operating condition of a fuel gas booster, for example. The determined capacity is then used to determine how to control the prime movers such as selecting an appropriate number of prime movers for operation. By controlling which of the prime movers operates responsive to available fuel capacity, the disclosed example avoids shutdowns of the on-site power plant that are otherwise associated with unmatched fuel consumption and fuel supply capacity.

Another example includes prioritizing which of the prime movers will be used responsive to a determination regarding a temperature control requirement. In one example, a determination is made regarding which cogeneration unit will best provide the needed temperature control. A decision is then made regarding which prime mover to operate to ensure that the determined cogeneration unit receives an exhaust stream for providing the desired temperature control. One example includes operating at least one prime mover at full capacity to obtain the best possible efficiency in power generation and in operation of the cogeneration unit.

A disclosed example combines each of the techniques mentioned above so that the power output from the on-site power plant corresponds to the power required at a load without exceeding the required power, corresponds to the available fuel capacity and controls operation of the prime movers so that fuel consumption does not exceed the available capacity, and ensures that a preferred cogeneration unit receives as much prime mover exhaust as possible to meet a temperature control requirement.

The various features and advantages of this invention will become apparent to those skilled in the art from the following detailed description. The drawings that accompany the detailed description can be briefly described as follows.

DETAILED DESCRIPTION OF THE PREFERRED EMBODIMENTS

Figure 1:
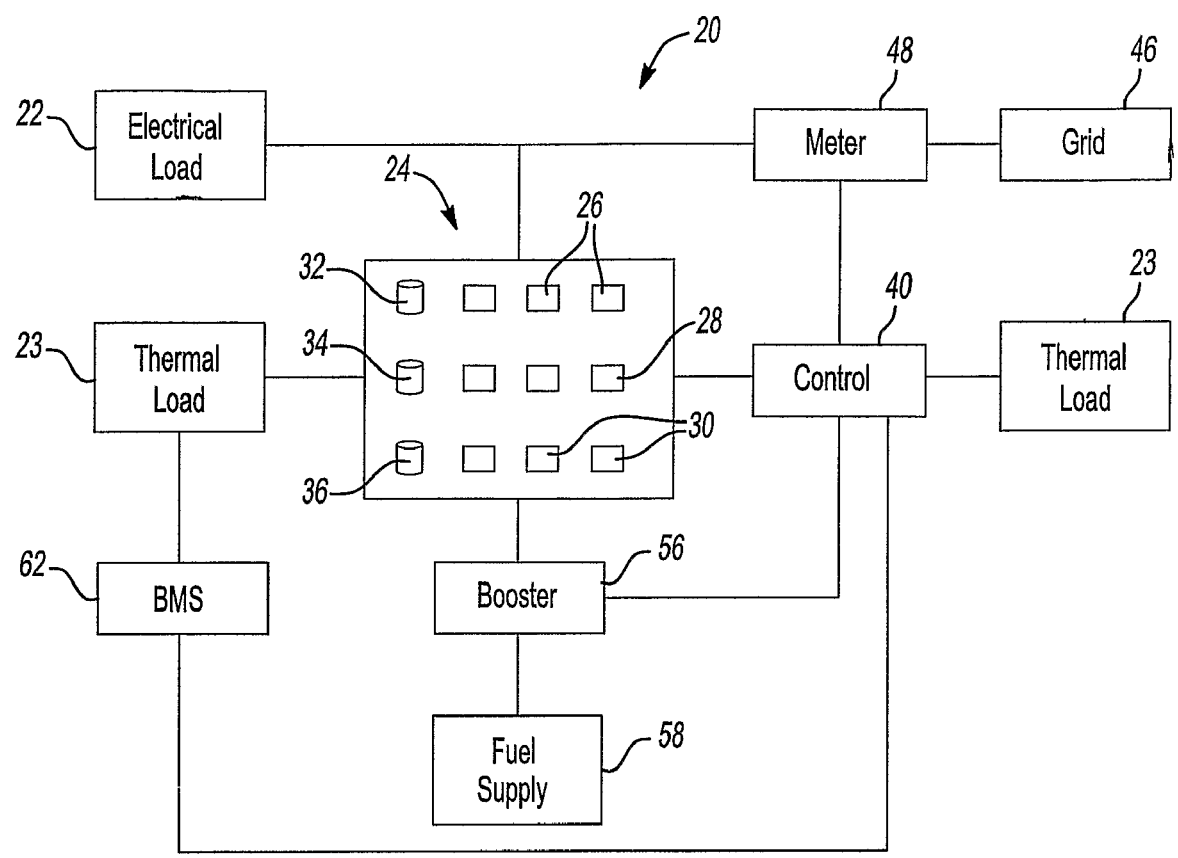
FIG. 1 schematically illustrates an on-site power plant arrangement designed according to an example embodiment of this invention.

FIG. 1 schematically shows a system 20 for providing power to a facility such as a building. The facility is schematically shown as an electrical load 22 and a thermal load 23 in the illustration. An on-site power plant 24 includes components arranged in a known manner for generating power for use by the electrical load 22 and to provide temperature control for the thermal load 23. In the illustrated example, the on-site power plant 24 includes a plurality of prime movers for generating power. In one example, the prime movers comprise microturbines.

In the illustrated example, the prime movers are grouped such that there are a first plurality of prime movers 26, a second plurality of prime movers 28 and a third plurality of prime movers 30. Each plurality of prime movers is associated with a cogeneration unit in a known manner. The cogeneration unit 32 is associated with the plurality of prime movers 26. Another cogeneration unit 34 is associated with the prime movers 28 while a third example cogeneration unit 36 is associated with the prime movers 30. As known, a cogeneration unit receives the exhaust stream on a selective basis from the prime movers associated with it. For example, the exhaust stream from the prime movers 26 is provided to the cogeneration unit 32 on a selected basis but not to the cogeneration units 34 or 36. Similarly, the exhaust stream from the prime movers 30 is supplied to the cogeneration unit 36 on a selective basis but not to the cogeneration units 32 or 34.

The illustrated example includes a controller 40 that controls operation of the prime movers. The example controller 40 utilizes information regarding various aspects of the requirements at the load 22, the load 23 or both, for selectively controlling operation of the prime movers of the on-site power plant 24. The example controller 40 has several capabilities that may be used individually or collectively to meet the needs of a particular situation. Given this description, those skilled in the art will realize what aspects of the example controller 40 will be useful in their situation. One controller is schematically shown for discussion purposes. Those who have the benefit of this description will be able to select one or more processors or to design appropriate hardware, software, firmware or a combination of them to realize a controller that meets the needs of their particular situation.

Figure 2:
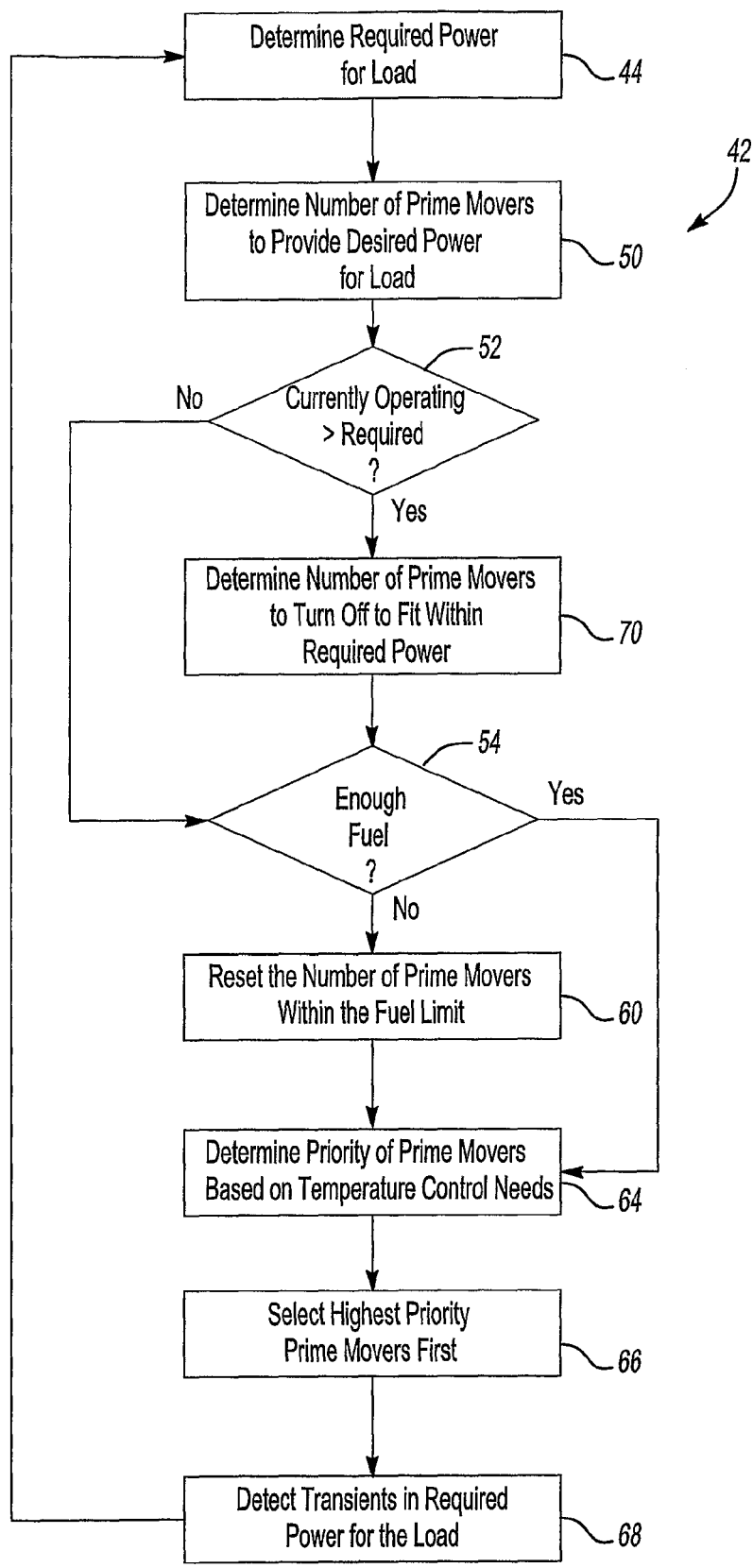
FIG. 2 is a flowchart diagram summarizing one example control strategy.

FIG. 2 includes a flow chart diagram 42 that illustrates one example control strategy. That includes various features of the example controller 40. Some example embodiments will not necessarily include every step schematically shown in FIG. 2. The flow chart 42 begins at 44 where the controller 40 determines the required power for the load 22. In the example of FIG. 1, the load 22 receives power from the on-site power plant 24 and an external source of power 46, such as a utility company. In the illustrated example, the controller 40 determines how much power is provided to the load by the outside power source or grid 46 through a conventional meter 48. The controller 40 also knows how much power is provided to the load 22 from the on-site power plant 24 because the controller 40 knows how many of the prime movers are commanded to operate at a given time. The controller determines the amount of power based on at least one of an indication of prime mover status from a suitable sensor, an estimate of power output levels developed by engineers, or both.

In FIG. 2, at 50, the controller 40 determines the number of prime movers required to provide the desired power for the load 22. In some examples, the controller 40 seeks to maximize the amount of power provided to the load 22 from the on-site power plant 24 to minimize the amount of power required from the grid 46. At the same time, the controller 40 seeks to avoid having the on-site power plant 24 produce any excess power not absorbed by the load 22 to avoid exporting power to the grid 46. As known, utility companies require protective relays that prevent power export from the on-site power plant 24 to the grid 46. Exporting power to a grid usually results in tripping a relay (not illustrated) that results in shutting down the on-site power plant 24. This is undesirable, in part, because resetting the relay is time-consuming and costly. The controller 40 monitors the power output of the on-site power plant 24 and selectively controls operation of the prime movers to avoid such situations.

In FIG. 2, at 52, the controller 40 determines whether the number of prime movers currently operating is greater than that required to meet the power requirements at the load 22. If the amount of power generated by the on-site power plant 24 is within the amount required by the load 22, the controller 40 continues at 54 to determine whether there is enough fuel for operating that number of prime movers.

As schematically shown in FIG. 1, a fuel booster arrangement 56 includes one or more known fuel booster devices. The fuel booster arrangement 56 provides fuel such as gas from a fuel supply 58 to the prime movers within the on-site power plant 24. The example controller 40 determines the operating condition of the fuel booster arrangement 56 to make a determination regarding the capacity for fueling the prime movers. In the event that one or more of the fuel boosters is malfunctioning or has been removed from service, the controller 40 may reset the number of prime movers to be operated to maintain that number within the available capacity. This is shown for example in FIG. 2 at 60. In one example, the controller 40 determines how many prime movers may operate at full capacity based upon a given fuel booster capacity. The controller 40 then selects the maximum number of prime movers that can operate at full capacity given the determined capacity.

Another example includes controlling operation of the prime movers in a manner that is based upon the available fuel booster capacity. For example, microturbine prime movers do not require as much pressure and do not have as high a fuel consumption rate during normal operation compared to start up. The controller 40, therefore, in one example, avoids simultaneously starting up the prime movers. Staggering the start times of the prime movers helps to even out the fuel consumption rate to keep it within the capacity provided by the available, operating fuel boosters within the fuel booster assembly 56. One advantage to this example arrangement is that the controller 40 avoids having the on-site power plant 24 shutdown because of inadequate fuel supply capacity for operating the desired number of prime movers at a given time. Some known systems tend to shutdown the entire system when fuel supply is inadequate to meet a demand of the prime movers that are supposed to be currently operating. The controller 40 of this example avoids that situation.

The disclosed example also allows for operating an on-site power plant even where there are relatively low inlet gas pressures. Additionally, the disclosed example reduces the number of boosters required and reduces the need to over-design boosters. Further, the disclosed example improves the availability of the prime movers by reducing the tendency for a gas booster fault or shutdown to impede operation of the on-site power plant.

Another feature of the example controller 40 is that it seeks to provide maximum temperature control capacity within the facility associated with the on-site power plant 24. In FIG. 1, a building management system 62 determines which of the cogeneration units 32, 34 or 36 will be best suited to meet a current heating or cooling demand associated with the thermal load 23. The temperature control function in one example is for controlling air temperature within a building. Another example includes a temperature control function for managing thermal energy of the on-site power plant 24 or for components of the plant such as instrumentation or controls. Such temperature control functions may be accomplished without a building management system 62, for example, and the thermal load 23 is schematically divided accordingly in the illustration. There are known techniques for making a determination regarding a desired temperature control function. The example controller 40 utilizes such information to set priorities for operating the prime movers to ensure that the best suited cogeneration unit receives adequate exhaust supply to meet the heating or cooling demand.

For example, if the controller 40 receives information from the building management system 62 that the cogeneration unit 34 is best suited to meet a given need, the controller 40 will prefer to operate the prime movers 28 before operating the prime movers 26 or 30 to ensure that the cogeneration unit 34 receives some exhaust stream. Additionally, in one example, the controller 40 prefers to operate at least one prime mover at full capacity more than operating multiple prime movers at less than full capacity. Operating a prime mover at full capacity provides higher efficiency in power generation. In one example, this provides the additional benefit of providing a sufficient exhaust gas stream, for example, to a cogeneration unit to allow for meeting the demand of the desired temperature control.

In FIG. 2, at 64, the controller 40 determines the priority of the prime movers based upon the temperature control needs. For building air temperature control, the controller 40 receives an indication from the building management system 62. For other control functions, the controller uses other appropriate indications. The example of FIG. 2 contemplates either or both. The controller 40 selects the highest priority prime mover first to provide the desired power and to enable operation of the preferred cogeneration unit. This is shown at 66 in FIG. 2.

A significant advantage to the disclosed example is that a controller 40 has the ability to adjust the operation of the on-site power plant 24 responsive to transients in the power requirements at the electrical load 22. In FIG. 2, at 68, the controller 40 detects transients in the power draw at the electrical load 22. The controller 40 then determines the required power for the electrical load 22 as a result of the transient. In the event of a down transient, the controller 40 determines how much power is required at a lower level compared to a current operating level.

Following the example flowchart 42, the result of the inquiry at 52 in the event of a down transient will be that there are too many prime movers operating for the lower power requirement. Instead of shutting off the entire on-site power plant 24, the controller 40 determines at 70 how to adjust the operation of the prime movers to respond to the reduced power requirement. In one example, the controller 40 determines how many of the currently operating prime movers to turn off within the required power limit. At least one of the prime movers continues operating to avoid completely shutting down the on-site power plant 24 whenever possible.

Of course, there will be situations when a shutdown of the entire plant is necessary to avoid tripping the relay. One example includes using the controller 40 for shutting down under such circumstances to avoid the drawbacks associated with tripping the relay. Controller-initiated shutdown allows for faster restart and avoids the negative impact that a relay shutdown may have on the service life of the prime movers.

In one example, the control strategy includes a preference to operate any running prime movers at a full operating capacity. In many instances, the controller 40 turns off a number of the prime movers that results in a difference in power output from the on-site power plant 24 that is greater than the difference between the power draw at the load 22 before and after the down transient. In other words, in one example, the controller 40 will turn off a prime mover instead of continuing to operate it at less than full operating capacity even if that will reduce the power output below the lower level needed as a result of the down transient. The controller 40 in one example always turns off enough of the prime movers so that the difference between the power output from the on-site power plant 24 before and after the down transient at the load 22 at least equals the difference in the power draw at the load 22 before and after the down transient.

In one example, the controller 40 selects which of the prime movers to turn off taking into account the fuel capacity and cogeneration temperature control needs as described above. The example strategy shown in FIG. 2 includes a combination of the control techniques for achieving desired operation of the on-site power plant 24.

The disclosed example provides several advantages compared to previous arrangements. The example controller 40 minimizes the reverse power export to the grid responsive to transients in the load requirements of virtually any size without requiring the on-site power plant 24 to shut down. Minimizing power export to the gird minimizes the possibility of tripping a site reverse power protective relay that would otherwise cause the on-site power plant to shut down. This improves the availability of the on-site power plant and provides better results for the customer at the facility.

The disclosed example also matches operation of prime movers to the requirements of the cogeneration units to maximize the heating or cooling effect within the facility. This improves system overall efficiency and enhances integration with building management systems.

Although a combination of features are shown in the illustrated example, not all of them need to be combined to realize the benefits of various embodiments of this invention. In other words, a system designed according to an embodiment of this invention will not necessarily include all of the steps shown in FIG. 2 or all of the portions schematically shown in FIG. 1.

One embodiment uses the example technique for adjusting prime mover operation without shutting down the entire plant responsive to down transients. The same example does not include the fuel booster capacity or temperature control monitoring features described above. Another example only includes the fuel capacity-based control technique. Another example combines two of the three. Yet another example only includes the control technique for maximizing temperature control capacity.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling an on-site power plant that has a plurality of prime movers for generating power, comprising:
    operating a plurality of prime movers to generate a first level of power for a load; and
    adjusting how the prime movers operate responsive to a down transient in the load while continuing operating at least one of the plurality of prime movers to generate a second, lower level of power for the load.

2. The method of claim 1, including
    detecting the down transient in the load;
    determining an amount of decrease in power required by the load corresponding to the detected down transient; and
    adjusting how the prime movers operate so that the on-site power plant does not provide more power than is required by the load.

3. The method of claim 2, including determining how many of the prime movers to turn off so that a difference between the first and second levels of power generated by the on-site power plant is at least the determined amount of decrease in power required by the load.

4. The method of claim 1, wherein each of the prime movers is associated with a cogeneration unit that utilizes exhaust from at least one of the associated prime movers to provide a temperature control function and the method comprises
    determining which of the prime movers to turn off responsive to a requirement for temperature control.

5. The method of claim 4, wherein the temperature control is for an air temperature within a building.

6. The method of claim 4, comprising
    determining which of the cogeneration units is preferred to meet the requirement for temperature control; and
    operating at least one of the prime movers associated with the determined preferred cogeneration unit at a higher priority than another prime mover associated with another cogeneration unit.

7. The method of claim 6, including operating at least one of the prime movers at full capacity and minimizing a number of the prime movers operating at a lesser capacity.

8. The method of claim 1, comprising
    determining a capacity for fueling the on-site power plant based on an operating condition of at least one fuel booster; and
    selectively operating the prime movers responsive to the determined capacity.

9. The method of claim 8, comprising
    turning off at least one of the prime movers responsive to detecting a decrease in the determined capacity while continuing to operate at least one other of the prime movers.

10. The method of claim 1, comprising selecting which of the plurality of prime movers to operate such that an amount of power supplied by the on-site power plant is no more than an amount of power required by the load.

11. An on-site power plant, comprising:
    a plurality of prime movers for generating power; and
    a controller configured to selectively operate the prime movers to generate a first level of power for a load and adjust an operation of the prime movers responsive to a down transient in the load while continuing to operate at least one of the prime movers to generate a second, lower level of power for the load.

12. The on-site power plant of claim 11, wherein the controller is configured to
    detect the down transient in the load;
    determine an amount of decrease in power required by the load corresponding to the detected down transient; and
    determine how many of the prime movers to turn off so that the on-site power plant does not provide more power than is required by the load.

13. The on-site power plant of claim 12, wherein the controller is configured to determine how many of the prime movers to turn off so that a difference between the first and second levels of power generated by the on-site power plant is greater than or equal to the determined amount of decrease in power required by the load.

14. The on-site power plant of claim 11, comprising a plurality of cogeneration units, each cogeneration unit associated with at least one of the prime movers such that the cogeneration units use exhaust from an associated prime mover to provide a temperature control; and
    wherein the controller is configured to determine which of the prime movers to turn off responsive to a requirement for temperature control.

15. The on-site power plant of claim 14, wherein the temperature control is for an air temperature within a building associated with the on-site power plant.

16. The on-site power plant of claim 14, comprising a device configured to determine which of the cogeneration units is preferred to meet the requirement for temperature control, and the controller communicates with the device, the controller is configured to prioritize operation of the prime movers based upon preferring to operate at least one prime mover associated with the determined preferred cogeneration unit before operating another prime mover associated with another cogeneration unit.

17. The on-site power plant of claim 16, wherein the controller operates at least one of the prime movers at full capacity.

18. The on-site power plant of claim 11, comprising at least one fuel booster that supplies fuel to the prime movers and wherein the controller is configured to determine a capacity for fueling the on-site power plant based on an operating condition of the at least one fuel booster, and the controller is configured to selectively operate the prime movers responsive to the determined capacity.

19. The on-site power plant of claim 18, wherein the controller is configured to turn off at least one of the prime movers responsive to detecting a decrease in the determined capacity while continuing to operate at least one other of the prime movers.

20. The on-site power plant of claim 11, wherein the controller is configured to determine an amount of power supplied to the load by the on-site power plant and an amount of power supplied to the load by another source of power external to the on-site power plant and the controller is configured to select which of the plurality of prime movers to operate such that an amount of power supplied by the on-site power plant is no more than an amount of power required by the load.

21. An on-site power plant, comprising:
a plurality of prime movers for generating power; and
a controller that is configured to do at least one of:
control operation of the prime movers to generate a first level of power for a load and adjust the operation of the prime movers responsive to a down transient in the load while continuing to operate at least one of the prime movers to generate a second, lower level of power for the load;
determine which of the prime movers to operate responsive to a requirement for temperature control in a facility associated with the on-site power plant; or
determine a capacity for fueling the on-site power plant and control operation of the prime movers responsive to the determined capacity.

22. The on-site power plant of claim 19, wherein the controller is configured to control operation of the prime movers such that the on-site power plant provides an amount of power that is no more than a required amount of power for the load.

* * * * *